(12) United States Patent
Sugiura et al.

(10) Patent No.: US 7,384,028 B2
(45) Date of Patent: Jun. 10, 2008

(54) RUBBER PART HAVING A METAL FITTING AND METHOD OF PRODUCING THE SAME

(75) Inventors: Takanori Sugiura, Nagoya (JP); Toyohisa Tohyama, Toyoake (JP); Takehiko Taguchi, Nagoya (JP)

(73) Assignee: Tokai Rubber Industries, Ltd., Aichi-ken (JP)

( * ) Notice: Subject to any disclaimer, the term of this patent is extended or adjusted under 35 U.S.C. 154(b) by 0 days.

(21) Appl. No.: 11/723,247

(22) Filed: Mar. 19, 2007

(65) Prior Publication Data

US 2007/0235914 A1    Oct. 11, 2007

(30) Foreign Application Priority Data

Mar. 22, 2006 (JP) ............................. 2006-079393
Nov. 20, 2006 (JP) ............................. 2006-313124

(51) Int. Cl.
*C23C 22/07* (2006.01)

(52) U.S. Cl. ................................... 267/140; 267/141.2

(58) Field of Classification Search ................ 148/261, 148/253; 516/348.5; 428/34.1, 348.5; 267/140, 267/141.1, 141.2

See application file for complete search history.

(56) References Cited

U.S. PATENT DOCUMENTS 6,440,231 B1 * 8/2002 Beiersdorf et al. ......... 148/261

2005/0175798 A1 * 8/2005 Kurokawa et al. ......... 428/34.1
2005/0228157 A1 * 10/2005 Peterson et al. ......... 526/348.5

FOREIGN PATENT DOCUMENTS

JP    6-179978 A    6/1994

* cited by examiner

*Primary Examiner*—Chris Schwartz
(74) *Attorney, Agent, or Firm*—Westerman, Hattori, Daniels & Adrian, LLP.

(57) ABSTRACT

A rubber part having a metal fitting in which the metal fitting and the rubber part are integrated through an anti-corrosion chemical film formed on a surface of the metal fitting. The anti-corrosion chemical film is a zirconium-based chemical film that is harmless to human body and environment, and is transformable following the squeeze of the metal fitting. The rubber part having a metal fitting is produced by the steps of: degreasing an outer peripheral surface of the metal fitting, subjecting the surface to shot blasting treatment, degreasing the treated surface, and water washing the treated surface; forming a zirconium-based chemical film on the treated surface; water washing and drying an outer peripheral surface of the zirconium-based chemical film; forming an adhesive layer on the outer peripheral surface of the zirconium-based chemical film; and integrating the rubber part on the outer peripheral surface of the adhesive layer.

2 Claims, 2 Drawing Sheets

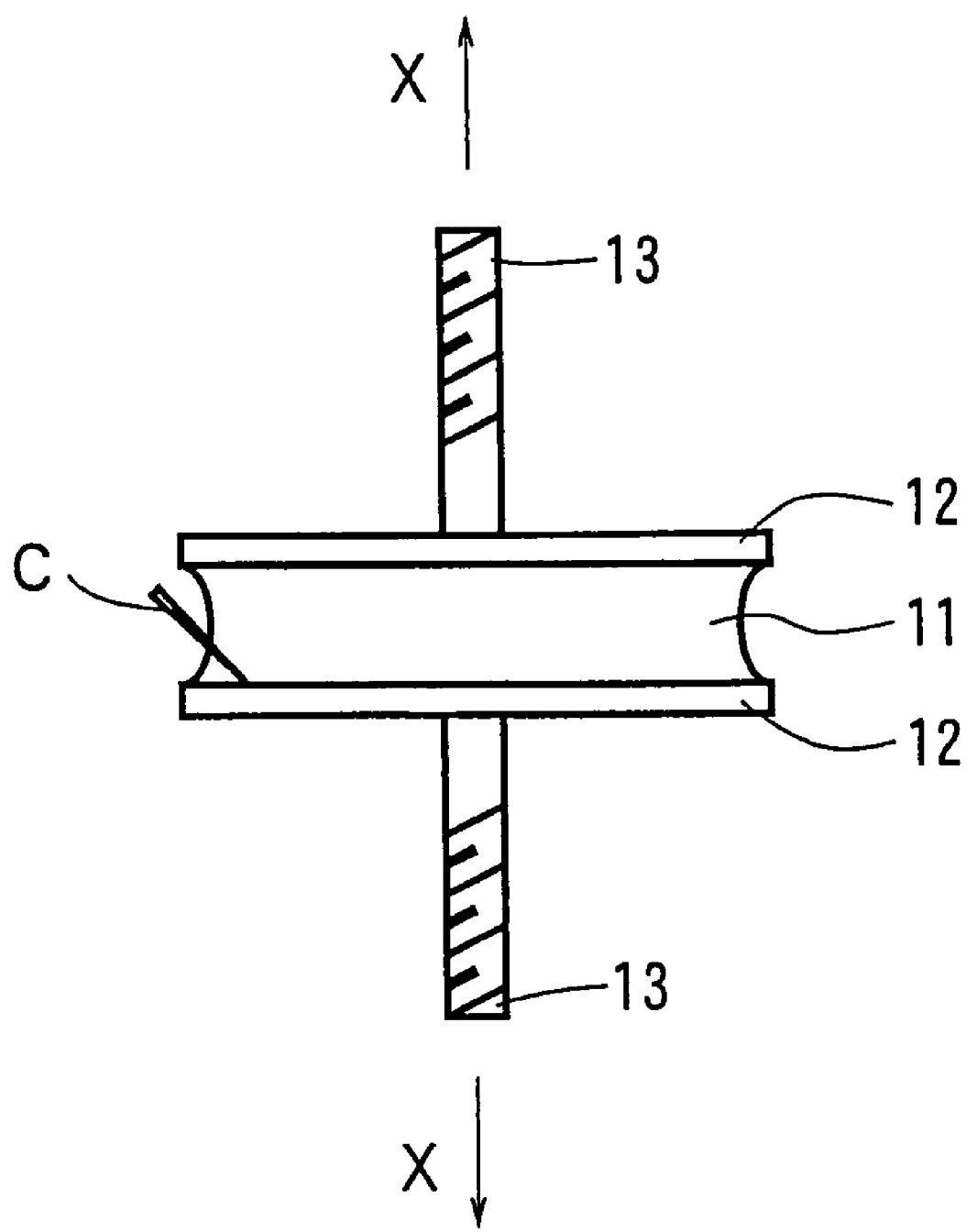

RUBBER PART HAVING A METAL FITTING AND METHOD OF PRODUCING THE SAME

BACKGROUND OF THE INVENTION

1. Field of the Invention

The present invention relates to a rubber part having a metal fitting such as a bushing and an engine mount for automobiles, and a vibration damping member for industrial machineries, and a method of producing the same.

2. Description of the Art

Generally, bushings and engine mounts for automobiles, and vibration damping members for industrial machineries consist of a rubber part having a metal fitting, which is formed by integrating the metal fitting and the rubber part and is used as a connecting member between various components of a frame or an engine.

The rubber part having a metal fitting has a problem that corrosion on a surface of the metal fitting on an interface between the rubber part and the metal fitting causes separation therebetween, leading to a deterioration of the function of the rubber part having a metal fitting. For preventing the corrosion, the surface of the metal fitting is generally subjected to chromate treatment to form a chromate-based chemical film on the surface as disclosed in, for example, Japanese Unexamined Patent Publication No. 6-179978.

However, the chromate treatment has a problem that chemical conversion treatment liquids used for the treatment include hexavalent chromium which causes damage on human bodies and environments.

Further, since crystallization water contained within the film structure of the chromate-based chemical film is easily dehydrated by heat generated during vulcanization of rubber, the film is vulnerable to cracks because of contraction of film and to deterioration of adhesiveness. If a metal fitting under this condition is processed for diameter reduction or the like, the film may be unable to transform following the squeeze of the metal fitting, and cracks may be formed in the film, which leads to insufficient protection against corrosion.

In view of the foregoing, it is an object of the present invention to provide a rubber part having a metal fitting provided with an anti-corrosion chemical film formed on the surface of the metal fitting, which is harmless to human bodies and environments and is capable of transforming following the squeeze of the metal fitting.

SUMMARY OF THE INVENTION

According to a first aspect of the present invention to achieve the aforesaid object, there is provided a rubber part having a metal fitting in which the metal fitting and the rubber part are integrated through an anti-corrosion chemical film formed on a surface of the metal fitting, and the anti-corrosion chemical film is a zirconium-based chemical film.

According to a second aspect of the present invention, there is provided a method of producing a rubber part having a metal fitting, which includes steps of forming an anti-corrosion zirconium-based chemical film on a surface of the metal fitting and integrating the metal fitting and the rubber part through the zirconium-based chemical film, and the method further comprises steps of: degreasing the surface of the metal fitting, subjecting the surface to shot blasting treatment, degreasing the treated surface, and water washing the treated surface in advance of forming the zirconium-based chemical film; and water washing the surface of the metal fitting formed with the zirconium-based chemical film, and drying the surface after the zirconium-based chemical film is formed.

Inventors of the present invention conducted intensive studies focusing on the facts that the zirconium-based chemical film has an excellent adhesiveness to metals of fittings or the like, that the film has an excellent anti-corrosion property even if the thickness of the film is thin, and that the film has a stable heat resistance during vulcanization process. As a result of studies, the inventors have found that since the zirconium-based chemical film is amorphous, the film is capable of transforming following the squeeze of the metal fitting in a diameter-reduction process or the like. Thus, the present invention has been achieved. After degreasing the surface of the metal fitting, subjecting the surface to shot blasting treatment, degreasing the treated surface and water washing the treated surface, the zirconium-based chemical film is formed on the treated surface of the metal fitting. After the zirconium-based chemical film is formed, the surface of the film is water washed and dried.

The rubber part having a metal fitting according to the present invention is provided with a zirconium-based chemical film which is formed on a surface of the metal fitting as an anti-corrosion chemical film. Since the zirconium-based chemical film has excellent adhesiveness to the metal fitting and is capable of transforming following the squeeze of the metal fitting, processing of the metal fitting such as diameter reduction does not cause cracks in the zirconium-based chemical film, thereby resulting in an excellent anti-corrosion property.

The production method of the rubber part having a metal fitting according to the present invention includes, in advance of formation of the zirconium-based chemical film, the steps of: degreasing the surface of the metal fitting, subjecting the surface to shot blasting treatment, degreasing the treated surface, and water washing the treated surface. These steps enable the zirconium-based chemical film to obtain an excellent adhesiveness to the metal fitting and transformability following the squeeze of the metal fitting. Further, since the metal fitting formed with the zirconium-based chemical film is water washed and dried after the film is formed, the film and the rubber part is firmly integrated.

BRIEF DESCRIPTION OF THE DRAWINGS

FIG. 3 is a front view of a test sample used in a salt water spray test.

DESCRIPTION OF THE PREFERRED EMBODIMENTS

Embodiments of the present invention will hereinafter be described in detail with reference to the attached drawings.

Figure 1:
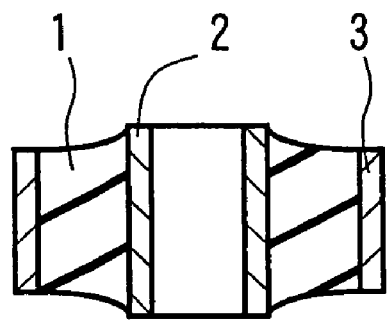
FIG. 1 is a vertical cross section of a cylindrical bushing formed as an embodiment of the present invention.

FIG. 1 is a vertical cross section of a cylindrical bushing for automobiles illustrating an embodiment of a rubber part having a metal fitting according to the present invention. According to this embodiment, the cylindrical bushing consists of a cylindrical vibration damping rubber part 1, an inner sleeve (cylindrical metal fitting) 2 that is coaxially bonded to the rubber part 1 on an inner peripheral surface thereof, and an outer sleeve (cylindrical metal fitting) 3 that is coaxially bonded to the rubber part 1 on an outer peripheral surface thereof.

Figure 2:
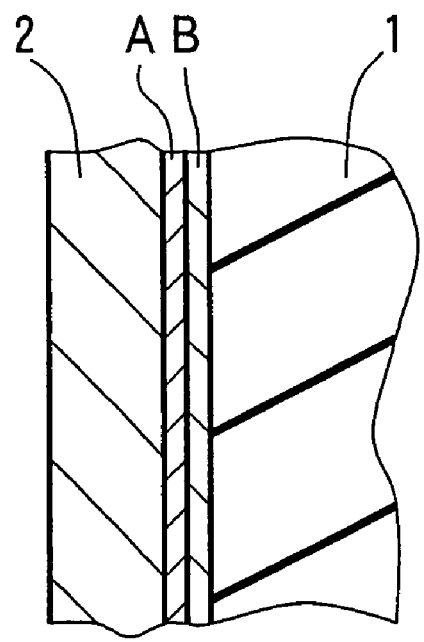
FIG. 2 is an enlarged cross sectional view showing a main portion of the cylindrical bushing in FIG. 1.

FIG. 2 is an enlarged cross section showing a bonding interface between the inner sleeve 2 and the vibration damping rubber 1, in which a zirconium-based chemical film A is formed on a whole outer peripheral surface of the inner sleeve 2, and an adhesive layer B is formed on an outer peripheral surface of the zirconium-based chemical film A, and the vibration damping rubber 1 is bonded to an outer peripheral surface of the adhesive layer B. A bonding interface between the outer sleeve 3 and the vibration damping rubber 1 has the same structure. An inventive feature of the present invention is the zirconium-based chemical film A provided on a surface of a metal fitting of a rubber part having a metal fitting such as a cylindrical bushing in the bonding interface between the rubber part such as the vibration damping rubber 1 and the metal fitting such as the inner and outer sleeves 2, 3.

The cylindrical bushing is produced by the following method, for example. An inner sleeve 2 and an outer sleeve 3 are soaked in a heated alkali degreasing liquid for degreasing a whole surface of each sleeve. The degreased whole surfaces of the inner and outer sleeves 2 and 3 are roughened by shot blasting treatment (average surface roughness at ten points (Rz) of approximately 10 μm to 30 μm). The sleeves are degreased again in the same manner as above, and washed with water in a water-washing bath. Thus treated inner and outer sleeves 2 and 3 are soaked in a chemical conversion treatment liquid (at 45° C. to 70° C. for 1 to 10 minutes) for forming a zirconium-based chemical film A (having a film mass of approximately 10 mg/m$^2$ to 100 mg/m$^2$ as converted into zirconium atomic weight) on a whole surface of each of the sleeves. After taking the sleeves out of the chemical conversion treatment liquid, the sleeves 2 and 3 are washed with water in the water-washing bath and dried (at 80° C. to 100° C. for 3 to 20 minutes). Thereafter, an adhesive is applied on each of an outer peripheral surface of the inner sleeve 2 and an inner peripheral surface of the outer sleeve 3 by spraying or the like for forming an adhesive layer B (having thickness of approximately 5 μm to 20 μm) on each of the surfaces. The inner and outer sleeves 2 and 3 are set in a mold to be aligned coaxially, and an unvulcanized rubber for forming the vibration damping rubber 1 is filled into a space enclosed by the inner and outer sleeves 2 and 3 and the mold, and vulcanized (at 140° C. to 200° C. for 5 to 60 minutes). After being removed from the mold, the molded rubber part having sleeves is compressed from the outer peripheral surface of the outer sleeve 3 to reduce the diameter of the sleeve 3 (approximately 10% of the outer diameter of the sleeve 3). Thus, the cylindrical bushing is obtained.

In thus obtained cylindrical bushing, the zirconium-based chemical film A is tightly adhered to the inner and outer sleeves 2 and 3, and is capable of providing an excellent anti-corrosion property even if the film thickness is thin (having a film mass of approximately 10 mg/m$^2$ to 100 mg/m$^2$ as converted into zirconium atomic weight). Further, since the zirconium-based chemical film A is amorphous, the film is capable of transforming without causing any crack following the squeeze of the metal fittings due to the diameter reduction process of the outer sleeve 3. Accordingly, the cylindrical bushing is provided with an excellent anti-corrosion property, thereby leading to advantageously long-continued adhesiveness between the vibration damping rubber 1 and the inner and outer sleeves 2 and 3, and vibration damping function of the cylindrical bushing.

Next, an explanation will be given to materials for forming the vibration damping rubber 1, the inner and outer sleeves 2 and 3, chemical conversion treatment liquid for forming the zirconium-based chemical film A, and materials for forming the adhesive layer B used in the foregoing production method.

Examples of materials for forming the vibration damping rubber 1 include natural rubber (NR), butadiene rubber (BR), styrene-butadiene rubber (SBR), isoprene rubber (IR), acrylonitrile-butadiene rubber (NBR), carboxyl-modified NBR, chloroprene rubber (CR), ethylene-propylene rubber (EPM, EPDM), maleic acid-modified EPM, butyl rubber (IIR), halogenated IIR, chlorosulfonated polyethylene (CSM), fluororubber (FKM), acrylic rubber, and epichlorohydrin rubber, which may be used alone or in combination. In addition to these materials, one or more of a reinforcing agent such as a carbon black, a vulcanizing agent, a vulcanization accelerator, a lubricant, an auxiliary agent, a plasticizer, an antioxidant and the like may be added, as necessary, depending on functions which the vibration damping rubber is required to have.

The inner and outer sleeves 2 and 3 are formed of metal that is not particularly limited, but examples of the materials include aluminum, iron, and stainless-steel.

The chemical conversion treatment liquid for forming the zirconium-based chemical film A is an aqueous solution of pH 3 to pH 5 containing hydrogen fluoride and zirconium compound. The concentration of zirconium in the chemical conversion treatment liquid is generally adjusted to within a range of 1 wt % to 10 wt %.

The adhesive layer B is formed of an adhesive that is not particularly limited, but generally formed of a commercially available adhesive such as CHEMLOK 205 and CHEMLOK 6108 (both available from LORD Corporation of North California, U.S.A.), which may be used alone or in combination.

The rubber part having a metal fitting according to the present invention is not limited to the foregoing cylindrical bushing for automobiles. The present invention is applicable to a variety of vibration damping parts such as a bushing having a shape other than a cylinder, an engine mount, a motor mount and the like to be used in automotive vehicles and other transport machines including aircraft; vehicles for industrial use such as a forklift, a wheeled tractor shovel, and a crawler crane; and railroad vehicles, as well as a variety of machines such as industrial machinery. Accordingly, the shape of the metal fitting is not limited to the cylinder, and may have other shapes such as a tabular shape or a corrugated shape. Where a metal fitting of the rubber part has any shape as exemplified above, the present invention generally consists of a rubber part disposed between upper and lower metal fittings in a sandwiching manner, or the present invention may consist of a rubber part provided with one metal fitting provided on either upper or lower side of the rubber part.

Next, Examples of the invention are described with reference to Conventional Example and Comparative Examples. It should be noted that the present invention is not limited to the Examples.

EXAMPLE 1

For producing a test sample as shown in FIG. 3, the following metal fittings and unvulcanized rubber for forming the vibration damping rubber 11 and the like were prepared.

[Metal Fittings]

Two circular discs 12 each having a diameter of 35.7 mm and formed of aluminum material ADC (aluminum die-cast)

12 were prepared. A bolt 13 was welded to one face of each disc 12 such that the bolt perpendicularly stands up from the face at the center thereof.

[Unvulcanized Rubber]

An unvulcanized rubber was prepared by blending 100 parts by weight of natural rubber, 35 parts by weight of HAF (High Abrasion Furnace) carbon black (SEAST 3, available from Tokai Carbon, Co., Ltd. of Tokyo, Japan), 5 parts by weight of zinc oxide (ZINC OXIDE I available from Sakai Chemical Industry Co., Ltd. of Osaka, Japan), 2 parts by weight of Stearic acid (LUNAC S-30 available from Kao Corporation of Tokyo, Japan), 0.7 parts by weight of vulcanization accelerator (SOXINOL CZ available from Sumitomo Chemical Co., Ltd. of Osaka, Japan), and 2 parts by weight of sulfur (SULFAX 200S available from Tsurumi Chemical Co., Ltd. of Ibaraki, Japan), and then kneading the blend by means of a kneader and a mixing roll.

[Chemical Conversion Treatment Liquid For Forming Zirconium-based Chemical Film]

PALCOAT 3796 available from Nihon Parkerizing Co., Ltd. of Tokyo, Japan was prepared.

[Formation of Zirconium-based Chemical Film]

The whole surface of each of the metal fittings was soaked in an alkali degreasing liquid heated to 60° C. for degreasing. The degreased whole surface of each metal fitting was roughened by shot blasting treatment (average surface roughness at ten points (Rz) of 20 μm). The metal fittings were degreased again in the same manner as above, and washed with water in a water-washing bath. Thus treated metal fittings were soaked in the above-mentioned chemical conversion treatment liquid (at 50° C. for 3 minutes) for forming a zirconium-based chemical film (having a film mass of 50 mg/m$^2$ as converted into zirconium atomic weight) on the whole surface of each of the metal fittings. After taking the metal fittings out of the chemical conversion treatment liquid, the metal fittings were washed with water in the water-washing bath and dried (at 80° C. for 10 minutes). The average surface roughness at ten points (Rz) was measured by means of a Surface Texture Measuring Instrument (SURFCOM1400D, product of Tokyo Seimitsu Co., Ltd. of Tokyo Japan). The film mass of the zirconium-based chemical film was calculated by converting values in a preliminarily prepared calibration curve of Fluorescent X-ray intensity values measured by means of an X-ray Fluorescence Spectrometer (EDX900-HS, product of Shimadzu Corporation of Kyoto, Japan) into zirconium atomic weight.

[Production of Test Sample] On a whole surface of each metal fitting on a side to which the bolt 13 is not welded, CHEMLOK 205, an adhesive available from LORD Corporation of North California, U.S.A., was applied by means of a spray, and further, CHEMLOK 6108, an adhesive available from LORD Corporation, was applied by means of a spray. Then, the metal fittings were dried (at 60° C. for 10 minutes) and an adhesive layer (having a thickness of 20 μm) was formed. The two disc-shaped metal fittings 12, 12 were set in a mold, and the unvulcanized rubber were filled in the space between the metal fittings and press vulcanized (at 150° C. for 20 minutes). Thus, a test sample comprising coaxially integrated column-shaped vibration damping rubber (having a thickness of 15 mm) 11 and the metal fittings as shown in FIG. 3 was obtained.

EXAMPLE 2

A test sample as shown in FIG. 3 was produced in the same manner as the Example 1 except that the disc-shaped metal fittings were formed of an iron material SPHC (Steel Plate Hot Commercial), and SURFDINE EC3200 (available from Nippon Paint Co., Ltd. of Osaka, Japan) was used as the chemical conversion treatment liquid for forming a zirconium-based chemical film (having a film mass of 100 mg/m$^2$ as converted into zirconium atomic weight).

CONVENTIONAL EXAMPLE 1

A test sample was produced in the same manner as the Example 1 except that a chromate-based chemical film (having a film mass of 100 mg/m$^2$ as converted into chromium atomic weight) was formed in place of the zirconium-based chemical film. For forming the chromate-based chemical film, CHEMIBONDER 334 (available from Japan Cee-Bee Chemical Co., Ltd. of Tokyo, Japan) was used as the chemical conversion treatment liquid.

COMPARATIVE EXAMPLE 1

A test sample was produced in the same manner as the Example 1 except that the zirconium-based chemical film was not formed.

COMPARATIVE EXAMPLE 2

A test sample was produced in the same manner as the Example 2 except that a zinc phosphate-based chemical film (having a coating mass of 5 g/m$^2$ measured by dissolution method) was formed in place of the zirconium-based chemical film. For forming the zinc phosphate-based chemical film, CHEMIBONDER 5020 (available from Japan Cee-Bee Chemical Co., Ltd. of Tokyo, Japan) was used as the chemical conversion treatment liquid.

COMPARATIVE EXAMPLE 3

A test sample was produced in the same manner as the Example 2 except that the zirconium-based chemical film was not formed.

[Initial Adhesiveness]

Each of thus obtained test samples of Examples 1, 2, Conventional Example 1, Comparative Examples 1 to 3 was fixed to a tensile testing machine through the bolt 13 welded to the metal fitting, and pulled in the axial direction (direction shown by arrow X). The tensile strength of each metal fitting was measured and shown in Tables 1 and 2. In the tensile tests, all samples were broken in the layer of the vibration damping rubber 11.

[Adhesiveness After Spraying Salt Water]

The vibration damping rubber 11 of each test sample was extended in the axial direction by 25% (pulled in the X direction), and notched on an end surface thereof with a cutter C. Then, each of the samples was set in an atmosphere of a temperature of 35° C. and a humidity of 95% RH, and continuously sprayed with aqueous sodium chloride solution of concentration of 5% for 1000 hours. Thereafter, peeling ratio (proportion of area that the vibration damping rubber 11 peeled) was measured and shown in Tables 1 and 2.

[Transformability of Chemical Film]

A rectangular flat plate having a size of 60 mm×25 mm×3 mm (thickness) was formed of each of the materials of the Examples 1, 2, Conventional Example 1, and Comparative Example 2, namely, aluminum material ADC12 and iron material SPHC, in the same manner as the Examples, and a chemical film was formed on each of the plates. On a portion having a dimension of 10 mm×10 mm in each chemical film, equally spaced cuts were made in a grid to form 100 squares of 1 mm×1 mm within the portion. After the portion having the grid cuts was convexly transformed in accordance with JIS (Japanese Industrial Standards) K5400 (Erichsen test), the film was heated by an oven at 150° C. for 20 minutes (a treatment assuming thermal load during vulcanization for forming the vibration damping rubber 11). Then, the adhesive CHEMLOK 205, an adhesive available from LORD Corporation of North California, U.S.A., was applied on the portion having the grid cuts, and the chemical film was dried. Thereafter, a tape peeling test was conducted in accordance with JIS K5400, that is, a tape was adhered on the film and peeled off from the film. The number of the square pieces of the film that did not move to the tape and remained on the rectangular flat plate was counted and shown in Tables 1 and 2. The chemical film in which greater number of pieces remained on the flat plate was determined to have greater adhesiveness and greater transformability following the squeeze of the metal fitting.

TABLE 1

|  | Example 1 | Conventional Example 1 | Comparative Example 1 |
|---|---|---|---|
| Material of Metal Fitting | Aluminum material ADC12 | | |
| Chemical Film | Zirconium-based | Chromate-based | — |
| Harmfulness of Chemical Conversion Treatment Liquid | Harmless | Harmful | — |
| Initial Adhesiveness (Broken portion) | 12.5 MPa (only in vibration damping rubber layer) | 12.2 MPa (only in vibration damping rubber layer) | 12.1 MPa (only in vibration damping rubber layer) |
| Adhesiveness After Spraying Salt Water | Proportion of peeling: 0% | Proportion of peeling: 0% | Proportion of peeling: 100% |
| Transformability of Chemical Film | 100 | 90 | — |

TABLE 2

|  | Example 2 | Comparative Example 2 | Comparative Example 3 |
|---|---|---|---|
| Material of Metal Fitting | Iron material SPHC | | |
| Chemical Film | Zirconium-based | Zinc phosphate-based | — |
| Harmfulness of Chemical Conversion Treatment Liquid | Harmless | Harmless | — |
| Initial Adhesiveness | 12.7 MPa | 12.5 MPa | 12.3 MPa |

TABLE 2-continued

|  | Example 2 | Comparative Example 2 | Comparative Example 3 |
|---|---|---|---|
| (Broken portion) | (only in vibration damping rubber layer) | (only in vibration damping rubber layer) | (only in vibration damping rubber layer) |
| Adhesiveness After Spraying Salt Water | Proportion of peeling: 0% | Proportion of peeling: 0% | Proportion of peeling: 100% |
| Transformability of Chemical Film | 100 | 70 | — |

As can be understood from the results shown in Tables 1 and 2, the chemical conversion treatment liquids used for forming the zirconium-based chemical films of Examples 1 and 2 are harmless, and the chemical films are excellent in transformability following the squeezes of metal fittings. Though the Comparative Example 2 is formed with the Zinc phosphate-based chemical film in which a harmless chemical conversion treatment liquid is used, this chemical film is less transformable.

What is claimed is:

1. A rubber part having a cylindrical metal fitting, the cylindrical metal fitting and the rubber part being integrated through an anti-corrosion chemical film formed on a surface of the metal fitting, the anti-corrosion chemical film being a zirconium-based chemical film, wherein the diameter of the cylindrical metal fitting is reduced after the zirconium-based film is formed on the cylindrical metal fitting.

2. A method of producing a rubber part having a cylindrical metal fitting, comprising steps of forming an anti-corrosion zirconium-based chemical film on a surface of the cylindrical metal fitting; and integrating the cylindrical metal fitting and the rubber part through the zirconium-based chemical film, the method further comprising steps of:
   degreasing the surface of the cylindrical metal fitting, subjecting the surface to shot blasting treatment, degreasing the treated surface, and water washing the treated surface in advance of forming the zirconium-based chemical film; and
   water washing and drying the surface of the metal fitting formed with the zirconium-based chemical film after the film is formed; and
   reducing the diameter of the cylindrical metal fitting after forming the zirconium-based chemical film on the surface of the metal fitting.

* * * * *